US008930497B1

(12) United States Patent
Holmes et al.

(10) Patent No.: US 8,930,497 B1
(45) Date of Patent: Jan. 6, 2015

(54) CENTRALIZED EXECUTION OF SNAPSHOT BACKUPS IN A DISTRIBUTED APPLICATION ENVIRONMENT

(75) Inventors: Daniel Holmes, Apex, NC (US); Luke Winckelmann, Bad Homburg (DE); Manfred Anton Buchmann, Salem (DE); Alvin Richards, Chapel Hill, NC (US)

(73) Assignee: NetApp, Inc., Sunnyvale, CA (US)

( * ) Notice: Subject to any disclaimer, the term of this patent is extended or adjusted under 35 U.S.C. 154(b) by 748 days.

(21) Appl. No.: 12/263,195

(22) Filed: Oct. 31, 2008

(51) Int. Cl.
*G06F 15/16* (2006.01)

(52) U.S. Cl.
USPC ............ 709/219; 709/217; 709/218; 709/220

(58) Field of Classification Search
USPC .................. 709/227, 229, 201, 203, 231, 232
See application file for complete search history.

(56) References Cited

U.S. PATENT DOCUMENTS

| | | | | |
|---|---|---|---|---|
| 5,732,275 | A * | 3/1998 | Kullick et al. ................. | 717/170 |
| 6,038,379 | A * | 3/2000 | Fletcher et al. ............... | 709/230 |
| 6,353,787 | B2 * | 3/2002 | Nishiyama ...................... | 701/93 |
| 7,831,562 | B1 * | 11/2010 | DeVos ........................... | 707/640 |
| 2002/0184244 | A1 * | 12/2002 | Hsiao et al. ................... | 707/201 |
| 2003/0217068 | A1 * | 11/2003 | Fruchtman et al. ........... | 707/101 |
| 2005/0154841 | A1 * | 7/2005 | Sastri et al. ................... | 711/148 |
| 2006/0129685 | A1 * | 6/2006 | Edwards et al. ............... | 709/229 |
| 2007/0192526 | A1 * | 8/2007 | Sharma et al. ................ | 710/311 |
| 2008/0147755 | A1 * | 6/2008 | Chapman ....................... | 707/204 |
| 2008/0177806 | A1 * | 7/2008 | Cannon et al. ................ | 707/204 |
| 2008/0184035 | A1 * | 7/2008 | Iyer et al. ....................... | 713/183 |
| 2008/0250145 | A1 * | 10/2008 | Sun ................................. | 709/227 |
| 2009/0119752 | A1 * | 5/2009 | Chandrashekhar et al. ...... | 726/4 |
| 2009/0183027 | A1 * | 7/2009 | Subhraveti ...................... | 714/13 |
| 2009/0288146 | A1 * | 11/2009 | Olsson et al. .................... | 726/4 |
| 2010/0076936 | A1 * | 3/2010 | Rajan ............................. | 707/677 |
| 2010/0313039 | A1 * | 12/2010 | Ignatius et al. ............... | 713/189 |

* cited by examiner

*Primary Examiner* — Djenane Bayard
(74) *Attorney, Agent, or Firm* — Perkins Coie LLP

(57) ABSTRACT

Systems and methods for centralizing database manipulation for a plurality of heterogeneous databases are disclosed. A single or limited number of central servers can be used to manage a plurality of hosted client systems. With such a technique, database consistent backups can be performed without requiring altering of the central server, even when different database engines are used across the hosted client systems.

25 Claims, 12 Drawing Sheets

US 8,930,497 B1

CENTRALIZED EXECUTION OF SNAPSHOT BACKUPS IN A DISTRIBUTED APPLICATION ENVIRONMENT

BACKGROUND

A hosted client system or computer server that runs a business application or any other type of application typically has its own local database for storing and maintaining the data for that application. It is not unusual to have hundreds or even thousands of application hosts operating within a hosted application service environment. Moreover, a wide variety of database engines employing different protocols, for example DB2 and MaxDB, can be used by these hosted client systems to create, retrieve, update, and delete data from their respective databases. Consequently, when a host server addresses the multiple databases in order to make back ups, the host server needs to be aware of the specific database engine and protocols in use with each database.

Typically, backup copies of the data stored in a database are made to a network data storage device, and the data storage device provides an application programming interface (API) to support requests for storage from the hosted client system's database server. However, the entire workflow, including tasks and evaluation check points, and API service component of the data storage device generally needs to be installed and running on each database server that accesses the data storage device. As a result, as the number of database servers in an enterprise increases, upgrade and management of the application becomes more complex.

Further, when a network data storage device is accessible by multiple database host servers, security management issues arise. For example, storage administrative passwords configured to the different database host servers must be maintained in order to prevent unauthorized access to data on the data storage device.

The foregoing examples of the related art and limitations related therewith are intended to be illustrative and not exclusive. Other limitations of the related art will become apparent upon a reading of the specification and a study of the drawings.

SUMMARY

The following examples and aspects thereof are described and illustrated in conjunction with systems, tools, and methods that are meant to be exemplary and illustrative, not limiting in scope. In various examples, one or more of the above-described problems have been reduced or eliminated, while other examples are directed to other improvements.

In accordance with at least one embodiment of the invention, an application agent is used on a hosted system running an application to provide a single shared API (application programming interface) to a central server to utilize during the backup workflow in order to hide the specific type of application being run on the hosted system. This technique allows the centralized backup service to coordinate backups with a multitude of applications, regardless of the type of application running on each hosted system and without requiring the centralized backup service to be altered. The application agent performs application manipulations such as quiesceing and unquiescing the application, but the agent does not interact with the primary storage. A single or limited number of central servers can be used to manage a plurality of hosted client systems. At least one embodiment of the invention supports snapshot based backups by a central server within a hosted application service environment and is scalable with respect to the number of application hosts served.

A system based on the technique can include a central server that accepts backup requests from a host server, and the central server then calls a database agent on the remote host when some type of database manipulation is required. The central server coordinates with a network storage system to perform database consistent backups. Other storage operation requests that may be made to the central server include provisioning, storage access, restore operations, and recover operations.

BRIEF DESCRIPTION OF THE DRAWINGS

Examples of a system and method for managing and providing centralized storage operation for distributed heterogeneous applications are illustrated in the figures. The examples and figures are illustrative rather than limiting. The centralized storage operation system and method are limited only by the claims.

DETAILED DESCRIPTION

Described in detail below is a method of centralizing storage operation requests at a central server for multiple hosted client systems. The central server communicates with an application agent residing on a hosted client system for performing calls to an application. The agent provides a shared application programming interface so that the central server does not need to know the particular resident application or the application's protocols. By centralizing the interaction with the storage system, there is no need for storage administrative passwords to be configured to the host servers, thus simplifying the security management for the storage system.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present disclosure include systems and methods for managing a centralized storage operation service to coordinate backups for a plurality of heterogeneous applications. In one embodiment, the applications could be a plurality of heterogeneous database engines, where different database engines are used to manage different databases. A single or limited number of central servers can be used to manage a plurality of hosted client systems. With such a technique, consistent backups can be performed without requiring altering of the central server, even when different applications are used across the hosted client systems.

Figure 1A:
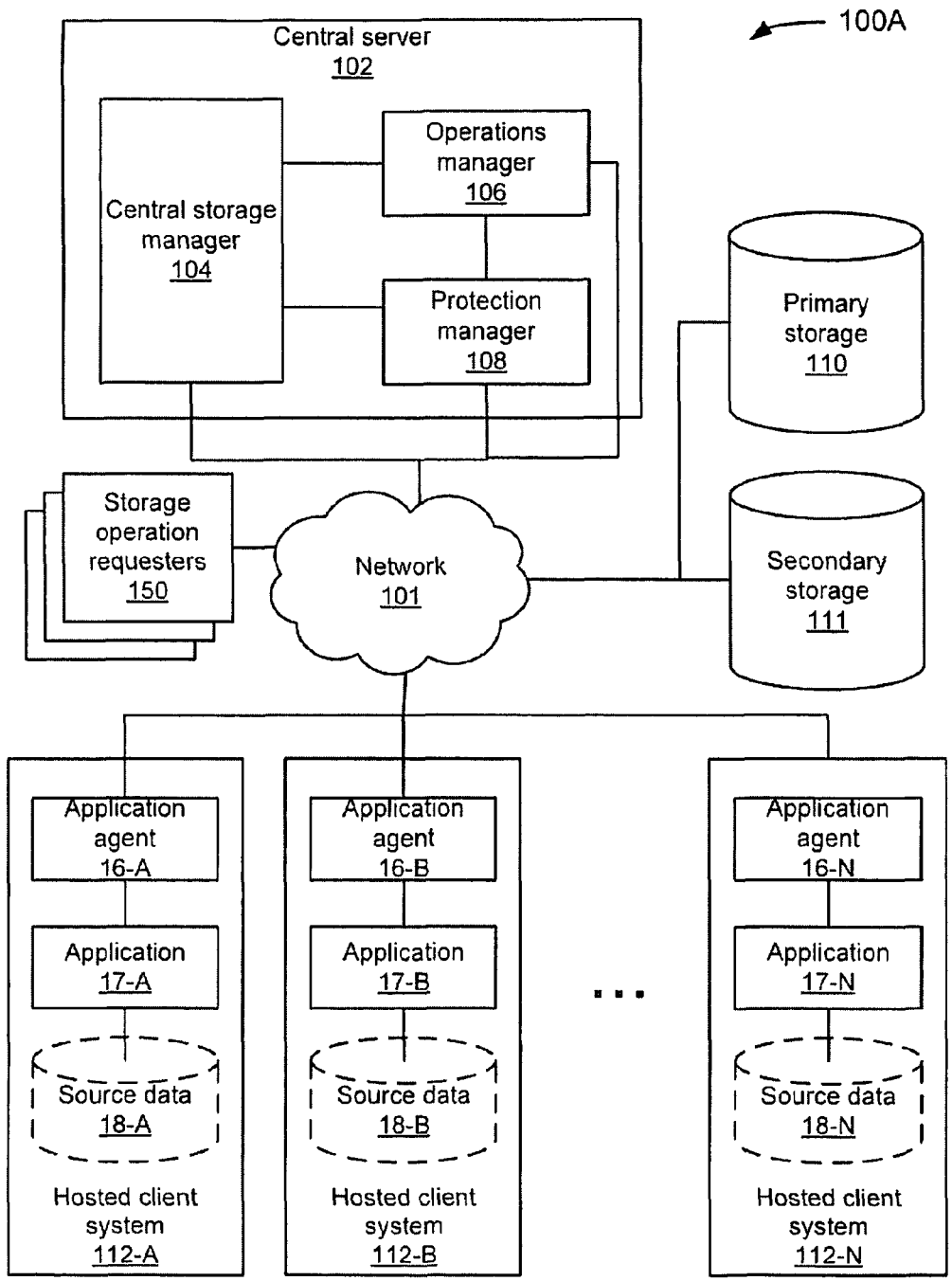
FIG. 1A depicts a block diagram illustrating an example system for centralizing and managing storage operations for a plurality of applications, according to one embodiment.

FIG. 1A illustrates a block diagram 100A of one or more storage operation requesters 150, a central server 102, a plurality of hosted client systems 112A-N, one or more primary storage locations 110, and one or more secondary storage locations 111 coupled via a network 101, according to one embodiment. For clarity, only one primary storage and one secondary storage are shown in block diagram 100.

The storage operation requesters 150 can be any system and/or device, and/or any combination of devices/systems that is able to send a storage operation request to the central server 102. Storage operation requests include provisioning storage, accessing storage, backing up storage, restoring storage, and recovering storage. Further, storage operation requests can be made in parallel by one or more requestors and processed in parallel by the central server.

In one embodiment, a storage operation requester 150 can be a host server or a server-class machine that provides computing power and storage to one or more users or hosted client systems 112A-N. In one embodiment, a single, centrally available service module can be used to initiate a backup of any specific hosted system. A non-limiting example of a service module includes a web service API (application programming interface), which is a software system designed to be accessed over a network, such as the Internet, and supports interoperable machine-to-machine interaction over that network and is executed on a remote system hosting the requested services.

The central server 102 can be any system and/or device, and/or any combination of devices/systems that is able to receive storage operation requests from hosted client systems, maintain login credentials for the primary and secondary storage systems, direct application agents regarding application manipulation, and transmit results of the storage operation requests to the requester. The central server 102 can include a central storage manager 104, an operations manager 106, and a protection manager 108. In one embodiment, the operations manager 106 can be internal to the central server 102. Alternatively, the operations manager 106 can be a separate product integrated with the central server 102. In one embodiment a limited number of central servers can be used to manage multiple database servers.

The central storage manager (CSM) 104 can be any combination of software agents and/or hardware components able to accept requests through a simple object access protocol (SOAP) interface. The CSM 104 is the main entry point into the centralized storage operation architecture and is the workflow coordinator.

The operations manager 106 can be any combination of software agents and/or hardware components able to configure login credentials, including user name and passwords, for the primary storage 110 and secondary storage 111 in one location. Centralized password management is also provided. Further, secondary storage locations are configured and setup to vault, that is allow storage server-to-storage server access, from the appropriate primary storage locations.

The operations manager 106 supports API calls to allow remote applications to send an API storage server call to a storage server. An API is an application program interface that provides the interface mechanism for making programmatic requests to the storage operating system. One example of a storage operating system is Data ONTAP®, a product offered by NetApp of Sunnyvale, Calif. Thus, the operations manager 106 maintains the login credentials for the storage servers and will proxy the API request for the CSM making the call. In one embodiment, the operations manager 106 can also support Simple Network Management Protocol (SNMP) messaging from one common location.

The protection manager 108 can be any combination of software agents and/or hardware components able to manage data with a dataset and policy. The protection manager 108 can be a plug-in to the operations manager 106. Required policies are added to the protection manager 108 by the owner of the hosted client systems prior to protecting the data. The policy specifies the steps for protecting the data. The dataset contains the list of volumes and/or qtrees to protect and the secondary location to vault the data into. Protection manager 108 can also perform functions including monitoring all protection tasks and storage resources globally, using policies to simplify and standardize data protection, locating unprotected data to prevent loss, identifying issues and recommending solutions, and increasing utilization of storage resources.

The application agents 16A-N are installed on the hosted client systems 112A-N by the owner of the hosted client systems. The application agents 16A-N can be any combination of software agents and/or hardware components, and each agent is a separate entity from the operating system of the hosted client system. The application agents 16A-N accept incoming SOAP requests from the central storage manager 104 over hypertext transfer protocol over secure socket layer (HTTPS) and makes calls to one or more of the applications 17A-N. A non-limiting example of an application 17A-N is a database engine, such as a relational database management system produced by Oracle Corporation of Redwood City, Calif. Because at least some of the applications 17A-N can be different, the application agents 16A-N installed on a hosted client system can make calls to a particular application or to multiple different applications running on that hosted client system. In one embodiment, a separate application agent is used for each of the different types of applications, and the owner of the hosted client systems 112A-N selects the appropriate application agent to be installed. Each application agent 16A-N implements a common application programming interface (API) so that the underlying application 17A-N, such as a database engine, is transparent to the CSM. Thus, the CSM need not be aware of the protocol used by the application 17A-N. Calls to the application 17A-N from an application agent 16A-N include starting the application, stopping the application, quiescing the application, unquiescing the application, recovering the application to a point in time, and recovering the application with all available log files. When an application is stopped, the application is made unavailable and data sets are closed, and when an application is started, the application is again made available and data sets are opened. When an application is quiesced, users can still use and write to the application, but the application manages how it writes to storage differently from when the application is not quiesced. When an application is unquiseced, the application resumes normal operation; quiescing and unquiescing the database avoids having to stop the application and perform another start of the application. When an application, such as a database, is recovered, the application is restored and rolled forward to a particular point in time or to the end of the available log files.

In one embodiment, the CSM coordinates all the steps of a storage operation request. For example, for a backup request, the CSM first calls the appropriate application agent to quiesce the application on the hosted system. Then the CSM calls the protection manager to request that storage level snapshots be taken on the application elements in the dataset and protected according to the policy. Next, the CSM polls the protection manager, as needed, until the CSM determines that the primary storage snapshots are complete. Then the CSM calls the application agent to unquiesce the application on the hosted system. In the next step, the CSM polls the protection manager, as needed, until the CSM determines that the primary storage to secondary storage transfer of the snapshots has been completed. Finally, the CSM returns final backup operation status to the requestor.

In one embodiment, the hosted client system 112A-N is a server computer that can run one or more applications 17A-N. Each hosted client system 112A-N has one or more application agents 16A-N that provide an interface to the central server 102 with the applications 17A-N. Thus, the number of hosted client systems 112A-N is scalable without requiring changes in the central server 102. The source data 18A-N used by the applications 17A-N are viewed by the respective applications 17A-N as being on the respective hosted client system 112A-N, but the actual data is stored at a network storage device, such as primary storage 110 and secondary storage 111, rather than a local disk within the hosted client system. Backups of the applications 17A-N are handled via storage level snapshots by the central server, and administrative access to the backup storage for system administrator functions is prohibited from a hosted system server.

Figure 9:
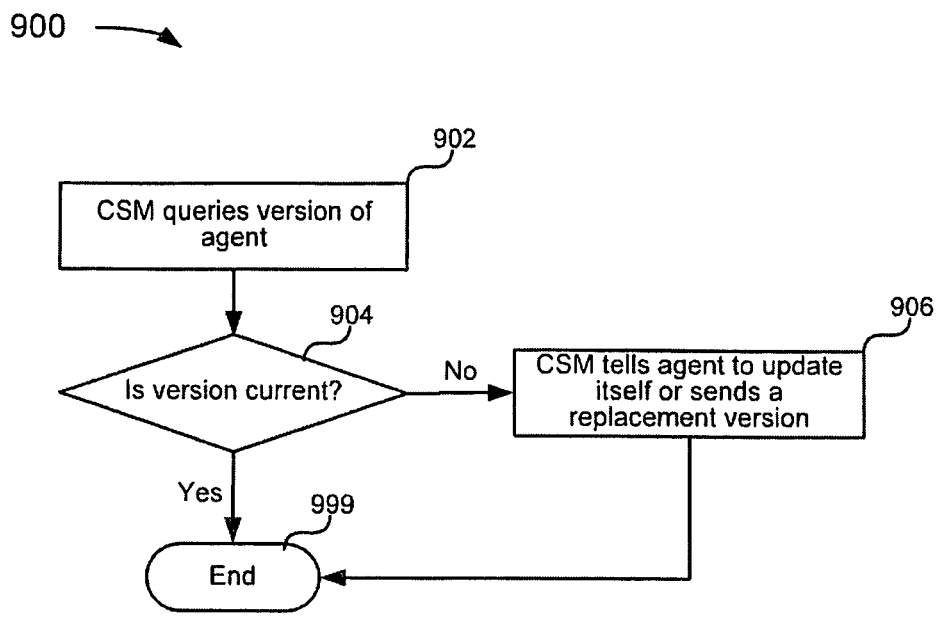
FIG. 9 depicts a block diagram illustrating an example system for updating the version of the application agent residing on a hosted client system.

In one embodiment, the central server 102 can download an application agent to a new or existing hosted client system on demand in order to manage the upgrade process of the backup application in a large scale enterprise with many hosted client systems. FIG. 9 depicts a flow diagram illustrating an example process 900 for updating the version of the application agent residing on a hosted client system. Prior to calling an application agent, at block 902, the CSM 104 asks the application agent 16A-N what version it is. At decision block 904, the CSM 104 determines whether the version of application agent is the latest available version. If the installed version is the latest available (904—Yes), the process ends at block 999, and the CSM 104 continues the call to the agent. If the version of the application agent is not the latest available (904—No), at block 906 the CSM 104 would tell the agent to update itself or automatically download a replacement version to the current application agent. After updating the application agent, the process ends at block 999, and the CSM continues the call to the application agent.

In one embodiment, the application agents 16A-N each include an in-memory structure for persisting data. Each application agent call is a simple, single action to be performed on the application, or against a database if the application agent provides an interface with the database. If the application is already in the correct state, nothing is done by the application agents 16A-N. One example of a call that may be long running is an application recovery from log files, such as a database recovery.

The primary storage 110 and the secondary storage 111 can be any computer readable medium capable of storing information such as software, descriptive data, images, system information, drivers, and/or any other data item utilized by parts of the host client systems 112A-N. The storage 110, 111 can be accessed by external applications through an Application Programming Interface (API). The secondary storage 111 is configured to allow storage server-to-storage server access from the primary storage 110.

The network 101 can be a local area network (LAN), wide area network (WAN), a metropolitan area network (MAN), global area network such as the internet, a Fiber Channel fabric. The network 101 can be a single network or any collection of distinct networks operating wholly or partially in conjunction to provide connectivity to the central server 102, the hosted client systems 112A-N, the primary storage 110, and the secondary storage 111, and can appear as one or more networks to the serviced systems and devices. In one embodiment, communications can be achieved by a secure communications protocol, such as secure sockets layer (SSL), or transport layer security (TLS).

Figure 1B:
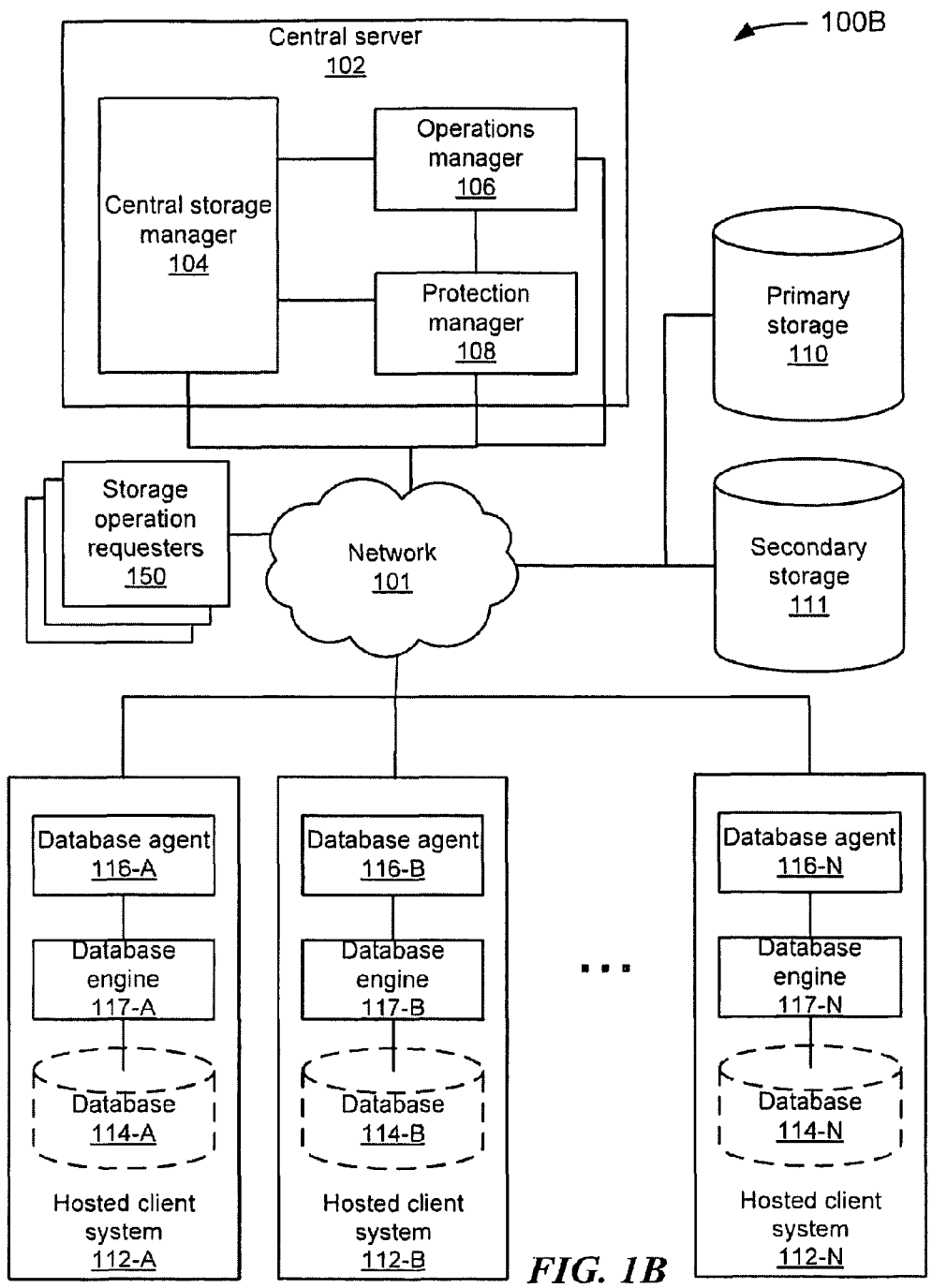
FIG. 1B depicts a block diagram illustrating an example system for centralizing and managing storage operations for a plurality of databases, according to one embodiment.

Additionally, although the central server 102 is illustrated as a single unit in FIG. 1A and FIG. 1B, it can be implemented with a distributed architecture. For example, the central server 102 can be designed as a physically separate network module (e.g., "N-blade" or N-module) and disk module (e.g., "D-blade" or D-module) (not shown), which communicate with each other over a physical interconnect. Such an architecture allows convenient scaling, such as by deploying two or more N-modules and D-modules, all capable of communicating with each other through the interconnect.

Figure 1C:
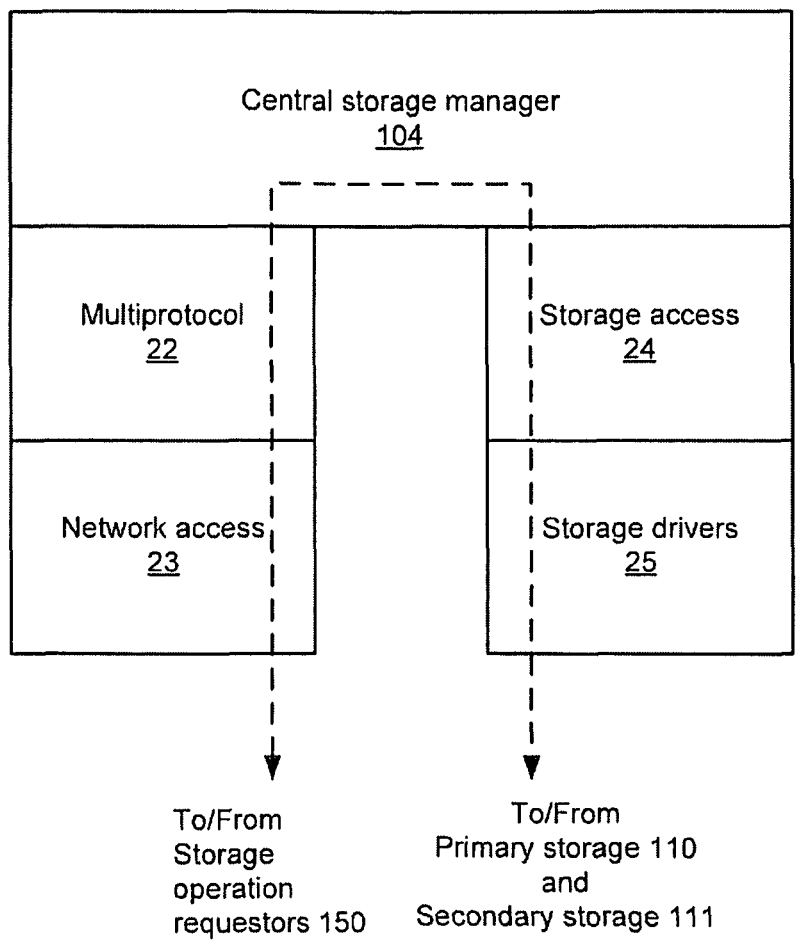
FIG. 1C is a block diagram of an example architecture of a storage operating system in a storage server.

In one embodiment, the central server 102 includes a storage operating system 100C to control its basic operations, and the storage operating system 100C can have a distributed architecture. For example, as shown in FIG. 1C, a multiprotocol layer 22 and network access layer 23 can be contained in an N-module (e.g., N-blade), where the multiprotocol 22 layer implements various higher-level network protocols, such as Network File System (NFS), Common Internet File System (CIFS), Hypertext Transfer Protocol (HTTP), Internet small computer system interface (iSCSI), and/or backup/mirroring protocols. The network access layer 23 includes one or more network drivers that implement one or more lower-level protocols to communicate over the network, such as Ethernet, Internet Protocol (IP), Transport Control Protocol/Internet Protocol (TCP/IP), Fibre Channel Protocol (FCP) and/or User Datagram Protocol/Internet Protocol (UDP/IP). Also as shown in FIG. 1C, the central storage manager 104, storage access layer 24 and storage driver layer 25 can be contained in a separate D-module (e.g., D-blade). The central storage manager 104 controls basic operations, for example reading and writing data in response to storage operation requests. The storage access layer 24 implements a higher-level disk storage protocol, such as RAID-4, RAID-5 or RAID-DP, while the storage driver layer 25 implements a lower-level storage device access protocol, such as Fibre Channel Protocol (FCP) or small computer system interface (SCSI). The N-module and D-module communicate with each other (and, possibly, other N- and D-modules) through some form of physical interconnect.

FIG. 1B depicts a block diagram 100B illustrating an example system for centralizing and managing storage operations for a plurality of databases, which is one particular embodiment of the system shown in FIG. 1A.

Each of the hosted client systems 112A-N is a server computer that runs one or more applications, including business applications. Each database agent 116A-N implements a common API interface so that communicating with the database engine 117A-N is transparent to the CSM. Calls to the database engine 117A-N from a database agent 116A-N include starting the database, stopping the database, quiescing the database, unquiescing the database, recovering the database to a point in time, and recovering the database with all available log files. When a database is stopped, the database is made unavailable and data sets are closed, and when the database is started, the database is again made available and data sets are opened. When a database is quiesced, users can still use and write to the database, but the database manages how it writes to storage differently from when the database is not quisceed. When the database is unquiseced, the database resumes normal operation; quiescing and unquiescing the database avoids having to stop the database and perform another start of the database.

In one embodiment, the hosted client system 112A-N includes a database 114A-N to maintain application data, such as business application data. The database 114A-N is managed by database engines 17A-N. The data in the databases 114A-N are stored at a network storage device, such as primary storage 110 and secondary storage 111, rather than a local disk within the hosted client system. Backups of the database 114A-N are handled via storage level snapshots by the central server; administrative access to the backup storage for system administrator functions is prohibited from a hosted system server.

The database engines 117A-N can be a relational database management system (RDBMS) such as DB2 or MaxDB, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package. The database engines 117A-N for each of the databases 114A-N may or may not be the same. In one embodiment, there can be multiple databases 114A-N, and each of the databases 114A-N can be managed by a different RDBMS. In one embodiment, a single database agent 116A-N has the ability to manage either a DB2 or a MaxDB database.

An example of how the CSM coordinates all the steps of a storage operation request is described here. For example, for a database backup request, the CSM first calls the appropriate database agent to quiesce the database on the hosted system. Then the CSM calls the protection manager to request that storage level snapshots be taken on the storage elements in the dataset and protected according to the policy. Next, the CSM polls the protection manager, as needed, until the CSM determines that the primary storage snapshots are complete. Then the CSM calls the database agent to unquiesce the database on the hosted system. In the next step, the CSM polls the protection manager, as needed, until the CSM determines that the primary storage to secondary storage transfer of the snapshots has been completed. Finally, the CSM returns final backup operation status to the requestor.

Figure 2:
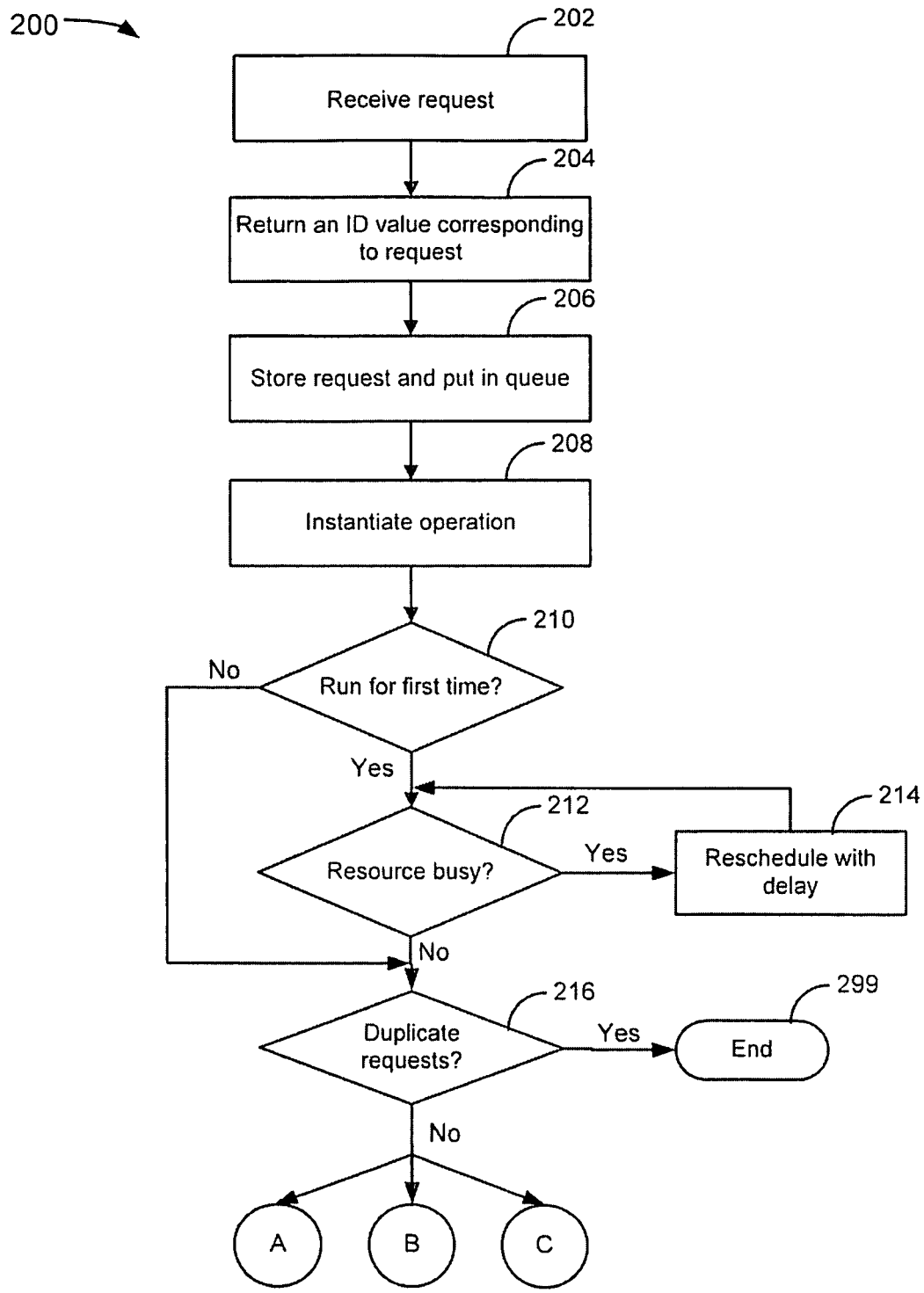
FIG. 2 depicts a flow diagram illustrating an example process for pre-processing a storage request, according to one embodiment.

FIG. 2 depicts a flow diagram illustrating an example process 200 for pre-processing a storage request, according to one embodiment.

At block 202, the CSM 104 receives a storage request using SOAP protocol over HTTPS from a hosted client system. HTTPS is used to help shield sensitive information. Storage requests include accessing storage, performing backup or restore operations, and performing recover operations. All communication with the CSM is done through asynchronous request processing. Although the CSM 104 maintains internal state to allow redo/recover after server restarts, any information that the CSM 104 needs to perform a task must be provided as input in the incoming SOAP message request.

At block 204, the CSM 104 returns an identifier to the requester that corresponds to the storage request. The identifier can be used by the requester to periodically poll for the status of the submitted request. Possible responses to polling include queued, running, paused, aborting, canceled, failed, and complete. The end points of the task are canceled, complete, and failed. Thus, the requester should continue to poll the CSM 104 until the task reaches one of these states.

At block 206, the CSM 104 uses an API to interface with the workflow system engine which accepts requests. A workflow, also called an operation, is a set of tasks and check points that must be evaluated to accomplish a goal. The request is stored and put in a queue managed within the persistence layer. Requests can be queued by the workflow engine based on different criteria. For example, only a certain number of specific request types can be allowed to be processed at a time, and the rest are queued until they are processed; only a certain number of specific request types per storage server may be allowed, and the rest are queued until they are processed; and only a certain number of specific request types per storage server may be allowed, and any additional requests are rejected and not processed. The workflow engine maintains its current state of workflow tasks persisted in a persistence layer in order to allow the workflow to run across central server restarts.

At block 208, a thread pool such as a scheduler pulls the next item from the queue to run, retrieves the data from the persistence layer, and instantiates the operation so that the workflow is actually executed. In one embodiment, the architecture allows for multiple thread pools, where specific thread pools can be designated to service specific request types.

Pretasks are performed to ensure that the workflow should even be evaluated. At decision block 210, the workflow system decides if the workflow is being run for the first time. If the workflow is being run for the first time (210—Yes), at decision block 212, the system determines if the resource required to take action is too busy to process the request. If the resource is too busy (212—Yes), at block 214 the workflow is rescheduled with a delay for later reevaluation at decision block 212. If the resource is not too busy (212—No), the process continues to decision block 216. Decision block 212 allows the system to check if a given storage server has too many of a particular task running already, for example, splits. If the workflow is not being run for the first time (210—No), the process continues to decision block 216.

Figure 3A:
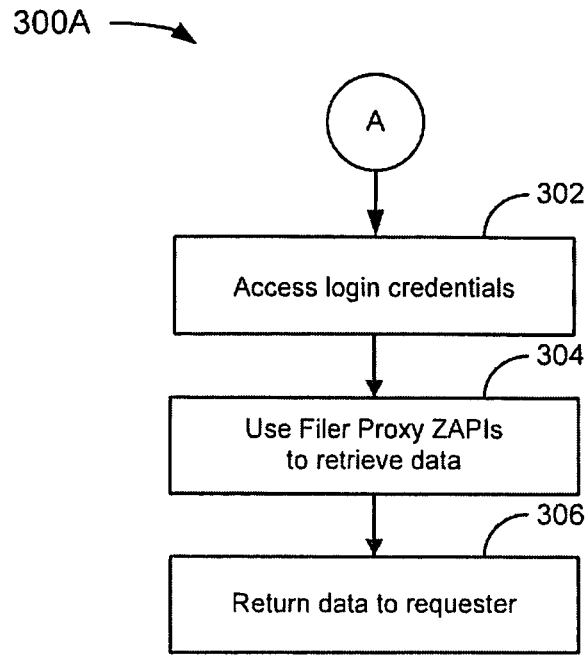
FIG. 3A depicts a flow diagram illustrating an example process for providing storage access, according to one embodiment.
Figure 3C:
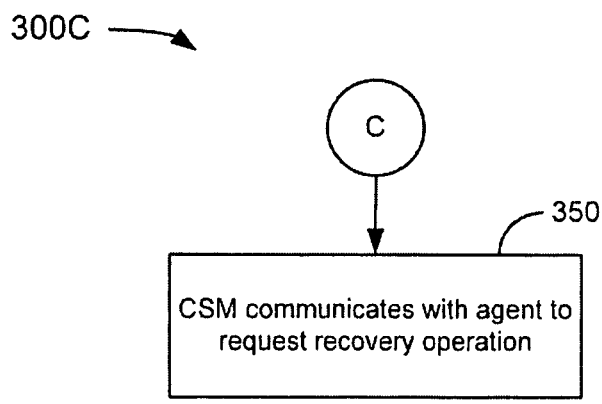
FIG. 3C depicts a flow diagram illustrating an example process for performing a database recover operation, according to one embodiment.
Figure 3B:
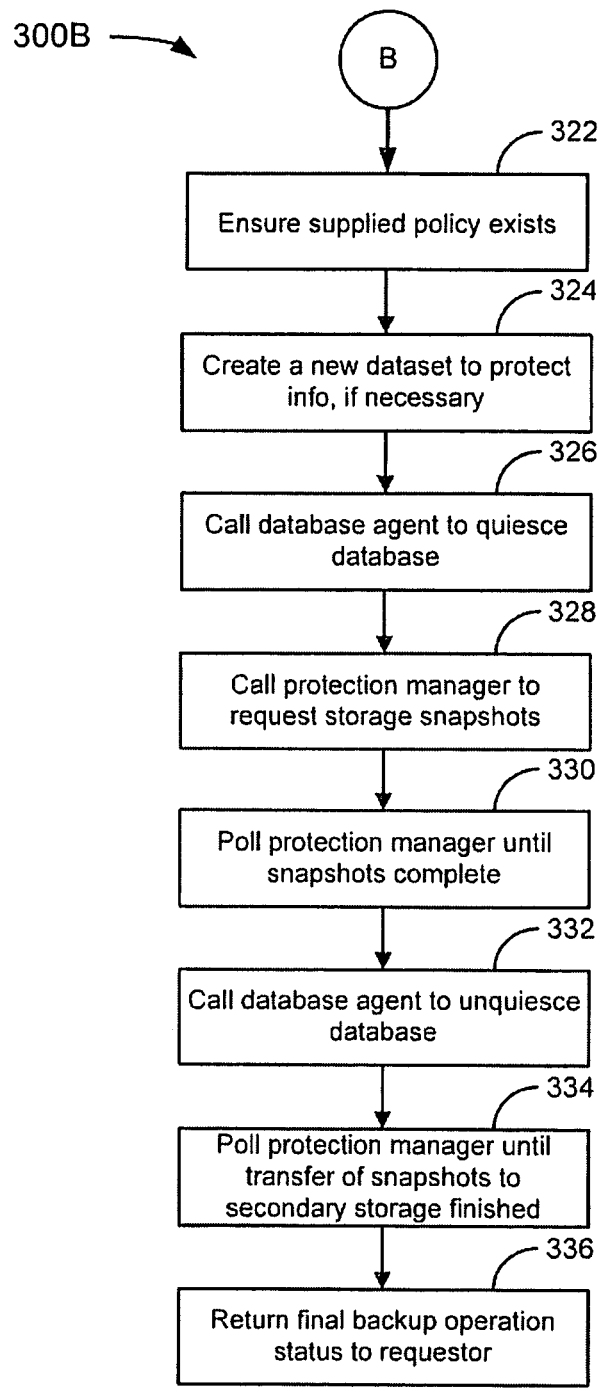
FIG. 3B depicts a flow diagram illustrating an example process for performing a backup or restore operation for a database, according to one embodiment.

At decision block 216, the system determines if the request has already been made. The request is considered a duplicate if all arguments of the request are exactly the same. If the request is a duplicate (216—Yes), the request is not performed, and the process ends at block 299. If the request is not a duplicate (216—No), the process continues depending on the type of storage request that has been made. If the request is to provide storage access, path A is followed as shown in FIG. 3A. If the request is to perform a backup or restore operation, path B is followed as shown in FIG. 3B. If the request is to perform a recover operation, path C is followed as shown in FIG. 3C.

FIG. 3A depicts a flow diagram illustrating an example process 300A for providing storage access, according to one embodiment. Note that the details on the workflow are not shown in flow diagram 300A. Lower-level details of the workflow that can be used in the operation are shown in flow diagram 700 in FIG. 7.

Passwords or login credentials to the storage servers 110, 111 are maintained in the operations and protection manager, and the CSM only needs to know which storage server to access. At block 302, the CSM 104 interacts with the operations manager 106 and the protection manager 108 through API calls to access the login credentials. At block 304, the CSM 104 uses the storage server proxy APIs to retrieve data from the storage server. At block 306, the CSM 104 returns the requested data to the requester.

FIG. 3B depicts a flow diagram illustrating an example process 300B for performing a backup or restore operation for a database, according to one embodiment. Lower-level details of the workflow that can be used in the operation are shown in flow diagram 700 in FIG. 7.

The CSM 104 communicates with the protection manager 108 through the use of API calls. At block 322, the CSM 104 ensures that the supplied policy exists within the protection manager 108. The policy specifies the steps for protecting the data.

At block 324, the CSM 104 creates a new dataset to protect the information, if necessary. The dataset contains the list of volumes and/or qtrees to protect and the secondary location to vault the data into.

Then at block 326, the CSM 104 calls from the central server 102 to the database agent operating on the hosted client system to quiesce the database on the hosted system.

At block 328, the CSM 104 communicates with the protection manager 108 with an API storage server call to request the storage level snapshots be taken on the primary storage elements in the dataset and protected according to the policy.

Next, at block 330, the CSM 104 polls the protection manager 108, as needed, until the CSM determines that the primary storage snapshots are complete. The protection manager 108 protects the data using the supplied policy.

After the primary storage snapshots have been performed, at block 332, the CSM 104 calls the database agent again in order to unquiesce the database on the hosted system. Unquiescing the database restores user access to the database without requiring a shutdown and a database restart.

Further, at block 334, the CSM 104 polls the protection manager 108, as needed, until it can be determined that transfer of the snapshots from the primary storage to the secondary storage has been completed.

Finally, at block 336, the CSM 104 returns final backup operation status to the requestor.

FIG. 3C depicts a flow diagram illustrating an example process 300C for performing a database recover operation from logs, according to one embodiment. Lower-level details of the workflow that can be used in the operation are shown in flow diagram 700 in FIG. 7.

At block 350, the CSM 104 communicates with the database agent directly for the recover operation without requiring the involvement of the protection manager 108.

The flow diagrams 300A, 300B, and 300C are high level steps performed by the central server 102 to process storage operation requests. Lower-level tasks are performed by the workflow system and are coordinated by the CSM or database agent. The workflow system is described below in conjunction FIG. 7 which illustrates an example process of a workflow.

Figure 4:
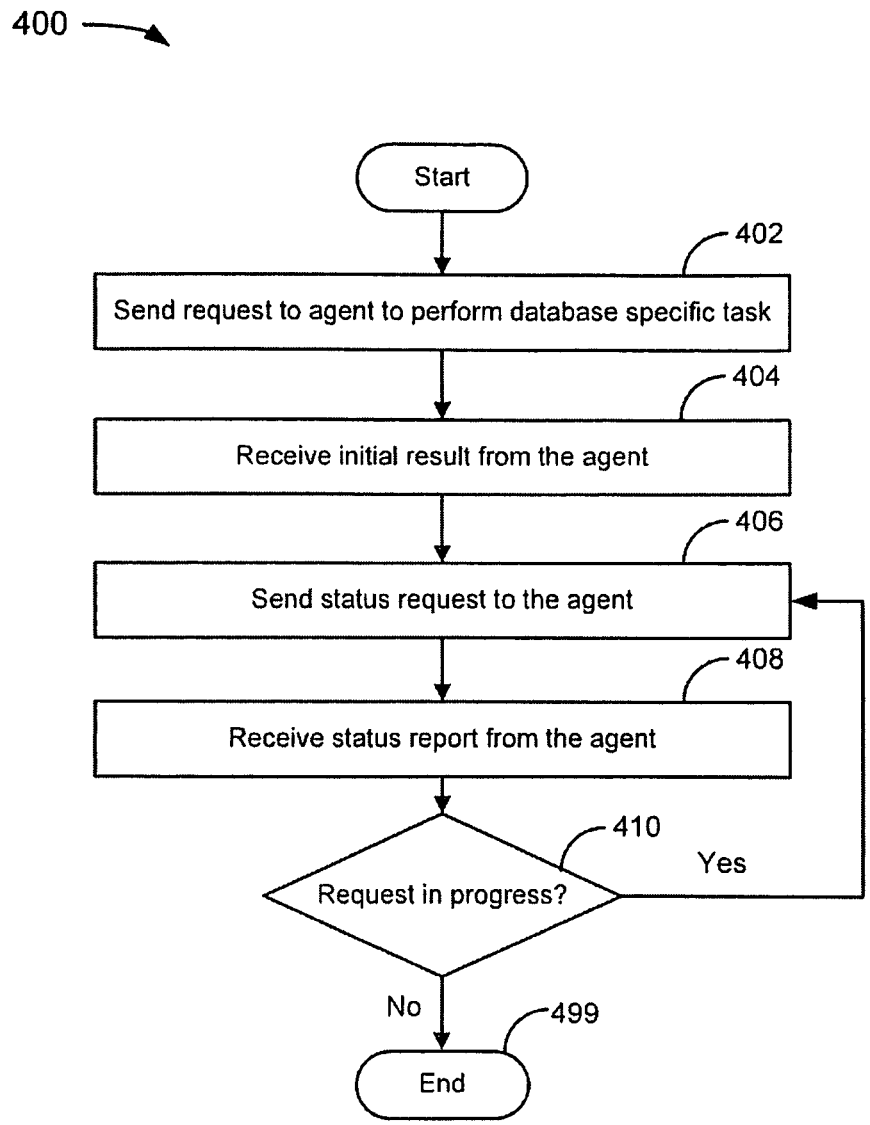
FIG. 4 depicts a flow diagram illustrating an example process for sending a database-related request to a database agent, according to one embodiment.

FIG. 4 depicts a flow diagram illustrating an example process 400 for sending a database-related request to a database agent from the central server 102 and polling for the status of the request according to one embodiment.

At block 402, a SOAP request is sent from the CSM to the database agent to perform a database-related task. The request is processed asynchronously. At block 404, the database agent sends an immediate response back to the CSM containing an identifier that can be used to poll the database agent about the status of the request.

At block 406, the CSM sends a status polling request to the database agent as a SOAP request over HTTPS. The CSM is expected to make several calls to determine the current state of an item in the workflow. At block 408, the database agent returns the status of the request. The status of the request can include queued, running, paused, aborting, canceled, failed, and complete. The end points of the task are canceled, complete, and failed. Thus, the CSM should continue to poll the database agent until the task reaches one of these states.

At decision block 410, the CSM determines whether the request is in progress based upon the response received in block 408. If the response is canceled, complete, or failed, the request is no longer in progress (410—No), and the process ends at block 499. If the response is other than canceled, complete, or failed, the request is still in progress (410—Yes), and the CSM continues polling until the task is no longer in progress.

Figure 5:
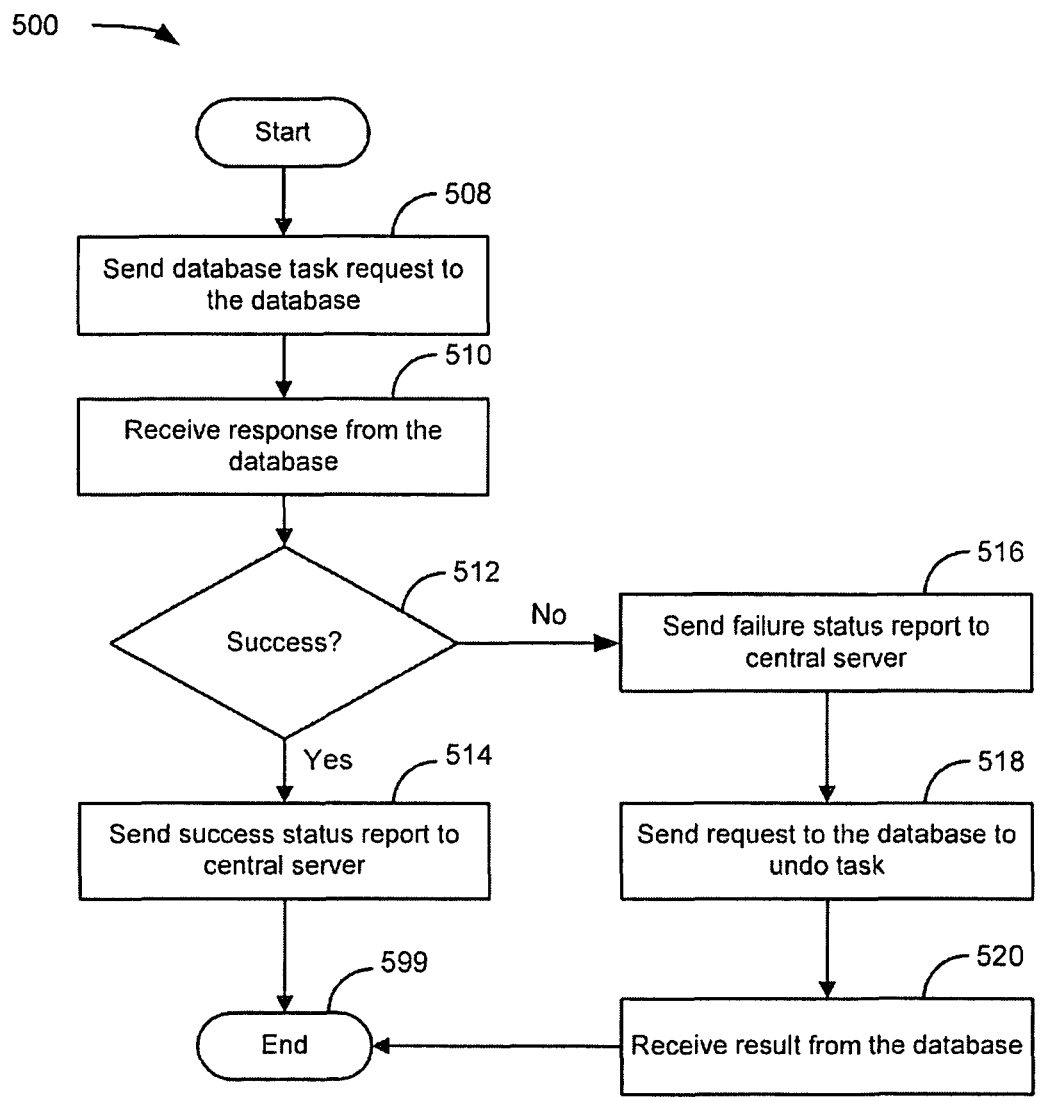
FIG. 5 depicts a flow diagram illustrating an example process of a database agent performing a database-related request, according to one embodiment.

FIG. 5 depicts a flow diagram illustrating an example process 500 of a database agent performing a database-related request, according to one embodiment.

After the database agent receives a request to perform a database specific task from the CSM, at block 508, the database agent sends the database task request to the database. At block 510, a response is received from the database by the database agent. At decision block 512, if the task was successfully completed by the database (512—Yes), at block 514, the database agent sends a successful status report to the CSM when polled, and the process ends at block 599.

At decision block 512, if the task was not successfully completed by the database (512—No), at block 516, a failure status report is sent by the database agent to the CSM when polled. At block 518, the database agent sends a request to the database to undo the task. At block 520, the database agent receives the result of the undo task from the database, and the process ends at block 599.

Figure 6:
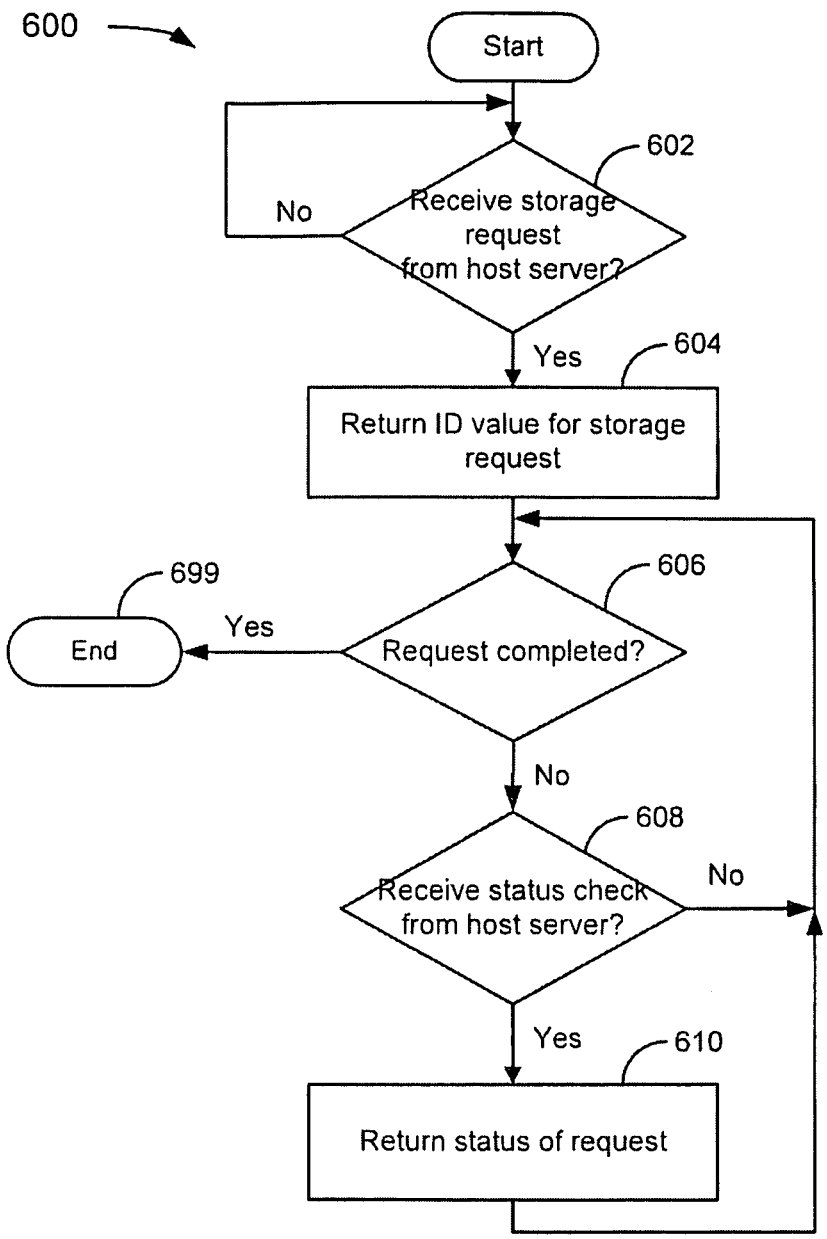
FIG. 6 depicts a flow diagram illustrating an example process for polling the central server about the status of a storage request, according to one embodiment.

FIG. 6 depicts a flow diagram illustrating an example process 600 for polling the CSM about the status of a storage request, according to one embodiment. The process is similar to the process for polling the database agent about the status of a request sent by the CSM, as shown in flow diagram 400.

At decision block 602, the CSM waits for a storage SOAP request from a storage operation requestor 150. If no request is received (602—No), the CSM continues to wait at decision block 602 for a request. If a request is received (602—Yes), at block 604 the CSM returns an identifier that can be used by the requester to poll the status of the request.

At decision block 606, if the request has been completed (606—Yes), the process ends at block 699. If the request has not been completed (606—No), at decision block 608, the system determines whether a status check request with an accompanying identifier has been received from a hosted client server. If no polling request is received (608—No), the system returns to decision block 606. If a polling request is received (608—Yes), the system returns the status of the request at block 610 and returns to decision block 606.

Figure 7:
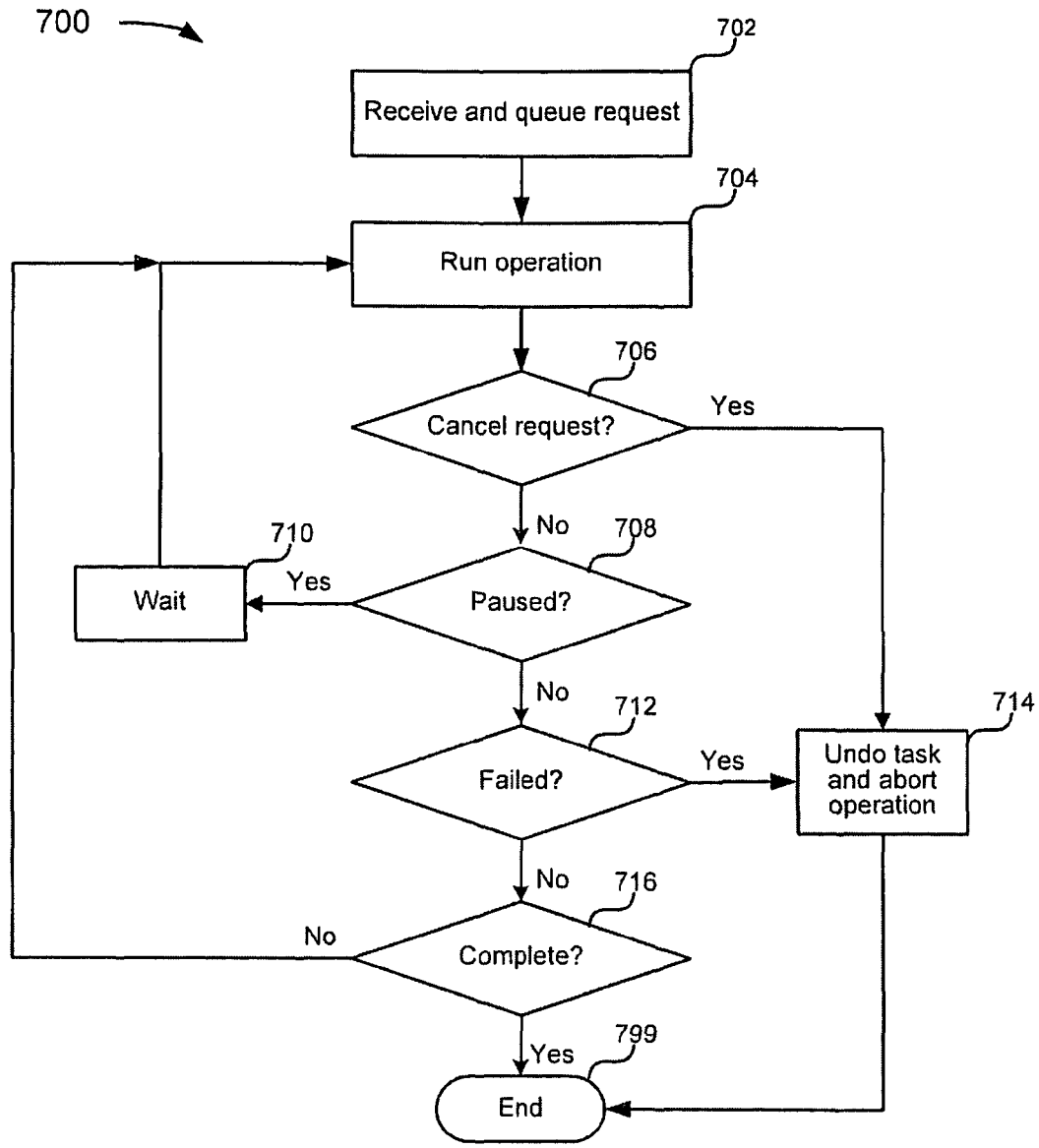
FIG. 7 depicts a flow diagram illustrating an example process of a workflow, according to one embodiment.

FIG. 7 depicts a flow diagram illustrating an example process 700 of a workflow performed by a workflow system, according to one embodiment. The workflow system performs the low-level tasks that are coordinated by the CSM or database agent in order to process a storage request. Details of the pretasks performed to determine whether the workflow should be evaluated are not shown because they were discussed in flow diagram 200.

A workflow, also called an operation, is a set of tasks and check points that must be evaluated to accomplish a goal. The CSM, database agent, and any other project that uses the workflow engine pre-defines a shared set of workflows that can be used. Some pieces of the workflows can be reused, and it may be possible to reuse the entire workflow. By using the shared backup workflow to take database consistent backups, the CSM does not have to be aware of the specific database engine in use. In one embodiment, a database agent capable of communicating with any type of database engine is not directly aware of the specific database engine in use because part of the request for backup from the storage operation requestor includes an identification of the type of database engine in use for the specific database hosted client system. Thus, the request specifies the database engine that the database agent will be interacting with. In one embodiment, the database agent may be capable of communicating with only a single database engine. The components of the workflows and the actual workflows are extension points within the workflow manager which is software that runs within the central server.

There are a set of inputs to a workflow, and each task within a workflow can define its own input and outputs. These variables can be passed along between calls as needed, but the only interaction between tasks is through this set of variables. The variables are persisted at each check point, and no other state within the workflow is accessed from within the task.

A check point is a concept that allows for restarting a workflow from a given point. Examples where a check point can be useful include continuing after a server crash and allowing a workflow to be suspended while waiting on an external change, such as any long-running operation initiated on the primary storage. When a check point is reached, the current state of the workflow is persisted. A check point can also define the undo check point. This is the construct that allows the normal processing of a workflow to define where in the undo workflow to start from depending upon what has been processed.

A workflow defines the set of tasks to accomplish to finish the goal, but also a set of tasks to undo the task from any step. There does not need to be a one-to-one correlation between a task and an undo task. For some workflows, the only undo step may be to revert back to some initial state, for example, revert to an initial snapshot.

In the event of a server crash, when the server comes back up, the queues will start up the workflows in the proper order. Each workflow that was already in progress will attempt to restart form its last check point with all of the state that was persisted at the last check point.

The workflow process applies to both the workflow for the CSM and the workflow for the database agent. The workflow system allows for a set of configurable tasks to be run within a finite number of threads. Callers interact with the workflow system asynchronously. The initial call sends back an identifier that can be used to periodically poll for the status of the submitted task, as discussed above in flow diagrams 400 and 600. The queued state is the expected starting state. There are three possible end points for a task: canceled, complete, and failed, and a caller should continue to poll until the task reaches one of these states. The workflow system maintains its state in a persistence layer, and the persistence layer is located inside a database for the CSM and within an in-memory structure for the database agent. A set of thread pools look for work to process within a queue, and the ordering of the queue is based on time and maintained in the persistence layer.

At block 702, the CSM or the database agent receives and queues a request. At block 704, after pretasks are performed to determine that the request is not a duplicate and that the resource required to take action is not too busy to process the request, the operation begins running in the workflow.

At decision block 706, the workflow system determines whether a cancel request has been submitted by the requester. A cancel request sets a flag to tell the task to abort the next time it is running after the current task and check point are executed. If a cancel request has been submitted (706—Yes), at block 714 the cancel request updates the state of the workflow to begin the undo process after the next task completes, and the optional check point persists the current state. The undo process consists of tasks and check points, just like the 'go path' of the workflow. Each check point in the 'go path' can reference a checkpoint in the undo process to begin the undo from. All prior tasks and check points in the undo process are then evaluated until the undo process is complete. The operation is aborted at block 714, and the process ends at block 799. The status at this point will be 'canceled'. 'Canceled' is only a valid state if a cancel request was made. If the task fails for any other reason, it will result in a 'failed' state.

If a cancel request has not been submitted (706—No), the process continues to decision block 708 where the workflow system determines if a task should be paused. When a workflow is executing a task that is expected to run for a long time, rather than consuming the thread entirely until completion, the task can notify the workflow to pause the task. A workflow can pause itself and be restarted in the queue from the last check point saved. If a pause occurs (708—Yes), the system reschedules the workflow to run again after a delay and waits the given delay time at block 710. The status is 'paused' during the delay. After waiting, the workflow is awakened to resume executing from the last check point at block 704.

If a pause does not occur (708—No), at decision block 712, the system determines if the task has failed. If the task fails for any reason (712—Yes), an undo task is performed, and the task is aborted at block 714. The process ends at block 799, and the status is a 'failed' state. In the event that a CSM workflow fails, the operation manager packages up all of the available information about the process, such as the log file and system environment, and creates a jar file. This step is done proactively instead of waiting for the end user to issue a dump command.

If the task does not fail (712—No), at decision clock 716, the system determines if the task has been completed. If the task has been completed (716—Yes), the status is 'complete', and the process ends at block 799. If the task is not finished (716—No), the process returns to block 704 where the task continues to run.

There is a workflow class that includes metadata that describes the rules by which objects used in a workflow behave. The workflow class has an interface that describes how the class and the workflow objects or instances can be interacted with via methods. The workflow class also has a structure that describes how the data is partitioned into attributes within an instance. The CSM or database agent interacts with the workflow class, and the management interface allows the CSM and database agent to make high level calls while hiding the queueing/aynschronous behavior.

In addition, other elements also run to provide a smooth workflow. A context manager provides a light-weight cache of contexts to prevent constant loading from persistent storage, where context is the minimal set of data used by a task that must be saved to allow the task to be interrupted at a certain date and a subsequent continuation of the task at the point it was interrupted at an arbitrary future date. A persistence manager handles all the requests for putting the information into storage or retrieving from storage. A scheduler is one of many thread pools which pull the next work unit from the persistence manager and then hands the work off to an operation so that the workflow is actually executed. A janitor is a periodically running thread that reclaims memory from persistence used by objects that will never be accessed or mutated again by an application.

Figure 8:
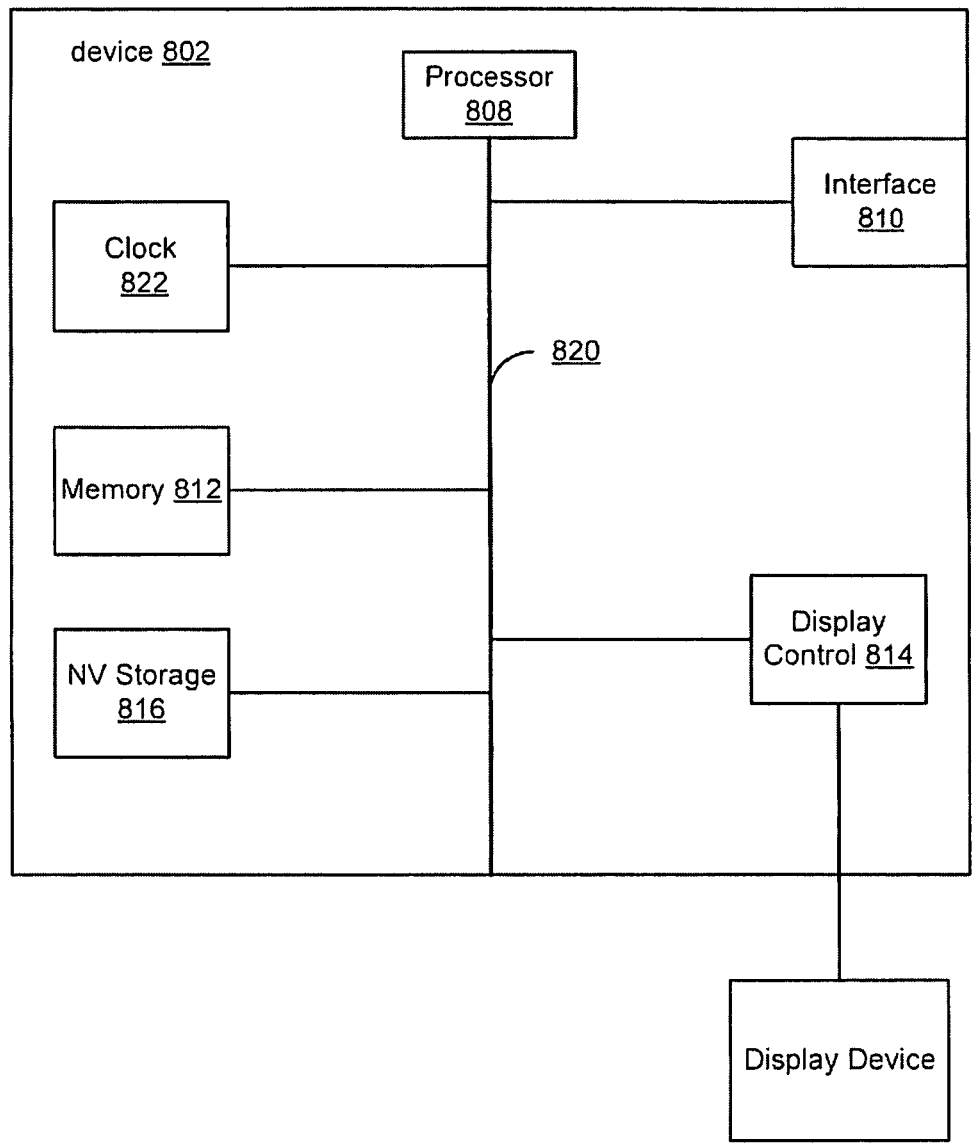
FIG. 8 depicts a block diagram illustrating an example system for a device providing storage operations for a plurality of applications, according to one embodiment.

FIG. 8 depicts a block diagram illustrating an example system 800 for a device providing storage operation for a plurality of applications, according to one embodiment. The system 800 can be a conventional computer system that can be used as a client computer system, such as a wireless client or a workstation, or a server-class computer system. The system 800 includes a subsystem 802, and a display device 806. The subsystem 802 includes a processor 808, a communications interface 810, memory 812, display controller 814, non-volatile storage 816, and clock 822. The subsystem 802 can be coupled to or include the display device 806. Some or all of these elements can be present in a particular system, and other elements not shown here can be included.

The subsystem 802 interfaces to external systems through the communications interface 810, which can include a modem or network interface. It will be appreciated that the communications interface 810 can be considered to be part of the system 800 or a part of the subsystem 802. The communications interface 810 can be, for example, an analog modem, ISDN modem or terminal adapter, cable modem, token ring IEEE 802.5 interface, Ethernet/IEEE 802.3 interface, wireless 802.11 interface, satellite transmission interface (e.g. "direct PC"), WiMAX/IEEE 802.16 interface, Bluetooth interface, cellular/mobile phone interface, third generation (3G) mobile phone interface, code division multiple access (CDMA) interface, Evolution-Data Optimized (EVDO) interface, general packet radio service (GPRS) interface, Enhanced GPRS (EDGE/EGPRS), High-Speed Downlink Packet Access (HSDPA) interface, or other interface for coupling a computer system to other computer systems.

The processor 808 can be, for example, a conventional microprocessor such as an Intel Pentium microprocessor or Motorola power PC microprocessor. The memory 812 is coupled to the processor 808 by a bus 820. The memory 812 can be Dynamic Random Access Memory (DRAM) and can also include Static RAM (SRAM). The bus 820 couples the processor 808 to the memory 812, also to the non-volatile storage 816, and to the display controller 814. The bus 820 can be any combination of one or more interconnects, bridges, controllers, and/or adapters.

The display controller 814 can control in the conventional manner a display on the display device 806, which can be, for example, a cathode ray tube (CRT) or liquid crystal display (LCD). The display controller 814 can be implemented with conventional well known technology.

The non-volatile storage 816 is often a magnetic hard disk, flash memory, an optical disk, or another form of storage for storing large amounts of data. Some of this data is often written, by a direct memory access process, into memory 812 during execution of software in the device 802. One of skill in the art will immediately recognize that the terms "machine-readable medium" or "computer-readable medium" includes any type of storage device that is accessible by the processor 808.

Clock 822 can be any kind of oscillating circuit creating an electrical signal with a precise frequency. In a non-limiting example, clock 822 could be a crystal oscillator using the mechanical resonance of a vibrating crystal to generate the electrical signal.

The system 800 is one example of many possible computer systems which have different architectures. For example, personal computers based on an Intel microprocessor often have multiple buses, one of which can be an I/O bus for the peripherals and one that directly connects the processor 808 and the memory 812 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 812 for execution by the processor 808. A Web TV system, which is known in the art, is also considered to be a computer system, but it may lack some of the features shown in FIG. 8, such as certain input or output devices. A typical computer system will usually include at least a processor, memory, and a bus coupling the memory to the processor.

In addition, the system 800 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 816 and causes the processor 808 to execute the various acts required by the operating system to input and output data and to store data in memory, including storing files on the non-volatile storage 816.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present example also relates to apparatus for performing the operations herein. This apparatus can be specially constructed for the required purposes, or it can comprise a general purpose computer selectively activated or reconfigured by a computer program stored in the computer. Such a computer program can be stored in a computer readable storage medium, such as read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present example is not described with reference to any particular programming language, and various examples may thus be implemented using a variety of programming languages.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. For example, the systems and methods may apply not just to databases, but to any application system that may need to be managed or quiesced during a backup process, for example, any business application software that is built on top of a database, or a content management application that writes medical images out as individual files where there is application read/write data that is not within a database. In one non-limiting example, a hosting provider may provide one of these types of business application software in a software-as-a-service role where there are a large number of systems that need to be backed-up using a single shared infrastructure. In this case, the entire application system is backed up, and calls to the database agents are used to manage backups of databases used by the application system, while calls to an application agent, similar to the function of a database agent but acting upon the application system, are used to perform application system tasks that quiesce the application system during storage operations. The elements and acts of the various embodiments described above can be combined to provide further embodiments.

While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A method of centralizing storage operations for a plurality of hosted client systems, comprising:

receiving at a central server a first storage operation request relating to a first application on a first one of the hosted client systems, wherein the first storage operation is to be performed on a network storage facility used by the first application;

calling a first agent by the central server to perform a first application task on the first application responsive to the first storage operation request, by using an application programming interface shared by the central server and the first agent, such that the central server need not be aware of a first application protocol used by the first application;

performing the first storage operation on the network storage facility used by the first application;

receiving at the central server a second storage operation request relating to a second application on a second one of the hosted client systems, wherein the second storage operation is to be performed on a network storage facility used by the second application, wherein the second application is different from the first application, and further wherein a second application protocol used by the second application is different from the first application protocol;

calling a second agent by the central server to perform a second application task on the second application responsive to the second storage operation request, by using the application programming interface further shared by the second agent, such that the central server need not be aware of the second application protocol; and performing the second storage operation on the network storage facility used by the second application.

2. The method of claim 1, wherein the storage operation request is selected from a group consisting of: provisioning storage; accessing storage, backing up storage, restoring storage, and recovering storage.

3. The method of claim 1, wherein multiple storage operation requests are processed in parallel.

4. The method of claim 1, wherein the plurality of hosted client systems operate with one or more different applications.

5. The method of claim 1, wherein the storage operation request is made by a requester using a service module.

6. The method of claim 1, wherein multiple storage operation requests are processed asynchronously.

7. The method of claim 1, wherein the central server manages application data with a dataset and a policy, and further wherein the dataset contains a list of volumes to protect, and the policy specifies steps for protecting the application data.

8. The method of claim 1, further comprising controlling access to a storage at the central server, so that administrative access to the storage is prohibited from a hosted client system, wherein the first storage operation and the second storage operation access the storage.

9. The method of claim 8, further comprising maintaining login credentials at the central server for the storage.

10. The method of claim 1, wherein a requester of the first storage operation request receives an identifier from the central server corresponding to the first storage operation request and uses the identifier to poll the central server about a status of the first storage operation request.

11. The method of claim 1, further comprising maintaining workflow tasks within a persistence layer to support central server restarts.

12. The method of claim 1, further comprising determining a version of the first agent and automatically downloading a new version of the first agent if the new version is not already running on the first one of the hosted client systems.

13. The method of claim 1 wherein the application task includes stopping the first application, starting the first application, quiescing the first application, unquiescing the first application, and recovering the first application.

14. The method of claim 1, wherein the central server and the first agent share a set of workflows for the storage manipulation request.

15. The method of claim 14, wherein one or more pieces of the sets of workflows can be reused.

16. The method of claim 1, further comprising:
coordinating by the central server and the first agent a pre-defined workflow, wherein the pre-defined workflow is shared by the central server and the first agent.

17. A method of managing a centralized backup service to coordinate backups for a plurality of hosted client systems, comprising:
receiving at a central server a first backup request for a first application and a second backup request for a second application, wherein the first application and the second application each run on one of the plurality of hosted client systems, wherein the first backup and the second backup are to be performed on a network storage facility, and further wherein the first application is different from the second application, and the first application and the second application use different application protocols;
executing a first pre-defined backup workflow within the central server and a first agent residing on a first one of the plurality of hosted client systems to make an application consistent backup at the network storage facility responsive to the first backup request, and executing a second pre-defined backup workflow within the central server and a second agent residing on a second one of the plurality of hosted client systems to make an application consistent backup at the network storage facility responsive to the second backup request; and
managing by the central server, via an API shared by the central server and the first agent and the second agent, application tasks of the first pre-defined backup workflow performed by the first agent and application tasks of the second pre-defined backup workflow performed by the second agent, wherein the application tasks are responsive to the first and second backup requests.

18. The method of claim 17, further comprising controlling access to the network storage facility at the central server, so that administrative access to the storage is prohibited from a hosted system server.

19. The method of claim 17, wherein multiple backup requests are processed in parallel.

20. The method of claim 17, further comprising determining a version of the agent and automatically downloading a new version of the agent if the new version is not already running on the one of the plurality of hosted client systems.

21. A system for centralizing storage operations for a plurality of applications running on a plurality of hosted client systems, comprising:
the plurality of hosted client systems, wherein each of the hosted client systems runs at least one of the plurality of applications, wherein the plurality of applications includes different types of applications, and each type of application uses a different application protocol;
a plurality of agents, wherein one of the agents is associated with each of the applications, and further wherein each agent is able to perform functions including stopping the associated application, starting the associated application, quiescing the associated application, unquiescing the associated application, and recovering the associated application;
a networked primary storage for the plurality of applications;
a networked secondary storage to vault data into from the primary storage; and
a central server, wherein the central server:
receives a first storage operation request for a first one of the plurality of applications and a second storage operation request for a second one of the plurality of applications, wherein the first one and the second one of the plurality of applications are different applications and use different application protocols, wherein the first storage operation request and the second storage operation request are to be performed on the networked primary storage;
coordinates a pre-defined workflow for each of the first storage operation request and the second storage operation request;
calls a first agent and a second agent, using an application programming interface (API) shared by the central server and the first agent and the second agent to perform application tasks responsive to the first storage operation request and the second storage operation request, respectively;
configures login credentials at the central server for the primary and secondary storage; and
performs storage server calls to the networked primary and secondary storage responsive to the storage operation request.

22. The system of claim 21, wherein the central server further determines a version of each agent and automatically downloads a new version of each agent if the new version is not already running on the plurality of hosted client systems.

23. A non-transitory machine readable medium storing instructions which when executed by a processor at a central server, cause the processor to:
first request for performing a first backup of a first application and a second request for performing a second backup of a second application and storing the first backup and the second backup on a network storage system, and further wherein the first application is different from the second application, and the first application and the second application use different application protocols;

execute backup workflows to make application consistent backups at the network storage system responsive to the first request and the second request; and manage application tasks of the workflows by calling agents via an application program interface (API) shared by the central server and the agents, wherein a first agent performs a first application task on the first application, and the first application task is responsive to the first request, and the second agent performs a second application task on the second application, and the second application task is responsive to the second request.

24. A method of centralizing storage operations for a plurality of applications hosted on a plurality of client systems, comprising:

receiving at a central server a first storage operation request relating to a first application and a second storage operation request relating to a second application, wherein the first application and the second application are different applications and use different application protocols, and further wherein the first storage operation request and the second storage operation request are to be performed on a network storage facility used by the first application and the second application;

calling a first agent by the central server to perform a first application task on the first application responsive to the first storage operation request, and calling a second agent by the central server to perform a second application task on the second application responsive to the second storage operation request, wherein the call to the first agent and the call to the second agent use an application programming interface shared by the central server and the first agent and the second agent, wherein the central server is not aware of the different application protocols; and performing the first storage operation and the second storage operation on the network storage facility.

25. The method of claim 24, further comprising controlling access to a storage at the central server, so that administrative access to the storage is prohibited from a client system, wherein the first storage operation and the second storage operation access the storage.

* * * * *